United States Patent Office 3,553,157
Patented Jan. 5, 1971

3,553,157
POLYESTER COMPOSITIONS AND SHAPING PROCESS
Albert Jan Dijkstra, Isaac Goodman, and James Angus Wilson Reid, Runcorn, England, assignors to Imperial Chemical Industries Limited, London, England, a corporation of Great Britain
Filed May 22, 1968, Ser. No. 731,028
Claims priority, application Great Britain, May 23, 1967, 23,986/67; Aug. 8, 1967, 36,361/67; Dec. 27, 1967, 58,670/67
Int. Cl. C08g *51/04*
U.S. Cl. 260—40
53 Claims

ABSTRACT OF THE DISCLOSURE

Preparing thick-walled shaped articles of improved physical properties from poly(ethylene terephthalate), especially by injection-moulding using a hot mould, by melt-shaping the polymer in admixture with a compound capable of reacting with at least two groups selected from —OH and —COOH; especially a polyisocyanate or uretidione oligomer thereof. The composition to be melt shaped may also contain glass fibres and a crystallisation promoter for the polymer.

---

The present invention relates to the conversion of polymeric compositions based on poly(ethylene terephthalate) to shaped thick-walled articles, to the shaped articles so obtained and to novel polymeric compositions suitable for such conversion.

The production from poly(ethylene terephthalate) of films, filaments, fibres and like articles wherein the polymer can be oriented by drawing has been known for many years. However, it is only recently that the production of useful shaped thick-walled articles by melt-shaping processes, such as for example injection-, compression-, or transfer-moulding or extrusion, has been proposed. (By thick-walled articles we mean articles whose shape and/or dimensions are such that they are not readily conducive to orientation of the polymer by drawing; for example moulded articles obtained by injection-, compression- or transfer moulding, and rods and thick-walled tubes obtained by extrusion.)

In order to obtain thick-walled articles having useful physical properties, and especially satisfactory notched impact strength, it has been found desirable for the polymer in the shaped article to have a relatively high molecular weight, especially where the polymer in the shaped article is in the crystalline state, and it has been suggested that molecular weights corresponding to intrinsic viscosities not below 0.56 (or relative viscosities not below 1.65) are required. We have found that molecular weights corresponding to intrinsic viscosities of at least 0.7 decilitre gram$^{-1}$ (as measured in a solution of the polymer in o-chlorophenol at 25° C.), and preferably much higher, are required. This is equivalent to a relative viscosity of at least 1.85.

The methods of obtaining shaped thick-walled articles from poly(ethylene terephthalate), hereinafter referred to for convenience as PET, by melt-shaping involve heating the PET above its melting point, shaping it, e.g. by pressing it into a mould or passing it through a die (e.g. of an extruder) while in the molten state, and then causing or allowing it to cool below its melting point while in contact with the shape-conferring surface or surfaces. The conditions encountered during such shaping processes induce degradation of the PET and therefore in order to obtain the desired molecular weight in the polymer of the shaped article it is generally desirable for the PET in the feedstock for the shaping process to have still higher molecular weight, e.g. corresponding to an intrinsic viscosity of at least 0.75 or 0.8 decilitre gram$^{-1}$, or even higher. Intrinsic viscosities of this order are substantially above those which are usual for the PET presently manufactured for conventional film and fibre production (usually of the order of 0.6–0.7 decilitre gram$^{-1}$).

Several methods have been proposed for obtaining higher molecular weight PET but basically they involve continuation of the polymerisation reaction either by applying solid state polymerisation techniques or by the addition to the polymerisation reactor at the end of the conventional polymerisation of a compound capable of linking the polymer chains together, or by continuous polymerisation methods.

Solid state polymerisations are tedious and very lengthy, and involve the use of expensive equipment such as pumps and vessels capable of operating at very high temperatures and very high vacuum, and fluidised bed reactors.

The use of a chain-linking compound in the polymerisation reactor, on the other hand, creates problems in stirring and in removing the polymer from the reactor because of the very high viscosity of the resultant melt.

Moreover, even if feedstock polymer of adequate molecular weight is obtained by any of these processes, further problems are presented. The first is that the higher the molecular weight of the PET used in the shaping process, the greater is the reduction in its intrinsic viscosity during the processing step as a result of degradations. For example, we have found that even if the intrinsic viscosity of the PET feedstock for a typical injection moulding cycle is raised from 0.65 to 0.92 decilitre gram$^{-1}$, equivalent to a relative viscosity above 2.1 (e.g. by the use of solid state polymerisation or by the addition of a chain linking compound to the polymer melt at the end of a conventional polymerisation reaction), the intrinsic viscosity of the polymer in the moulded article is only raised marginally from 0.62 to 0.68 decilitre/gram$^{-1}$, and is still, therefore, below the desired minimum level.

If feedstock PET of very much higher molecular weight is used (e.g. having an intrinsic viscosity of 1.3 or more), it is difficult to achieve faithful mouldings because of the very high melt viscosities that are then involved. Increasing the melt temperature to offset this rise in viscosity only increases the rate of degradation of the PET, and therefore there is necessarily a top limit both to the molecular weight of the PET that can be used as feedstock in presently available shaping apparatus such as injection-moulding and screw-extrusion equipment, and also to the molecular weight that can be obtained in the polymer in the shaped article.

We have now discovered a method of obtaining thick-walled shaped articles of satisfactory molecular weight and impact strength from PET-based feedstock having melt viscosity characteristics which allow it to be shaped on conventional thermoplastic shaping machinery, as exemplified in particular by injection moulding apparatus and extruders.

Our method also allows the conversion of normal film- and fibre-grade PET, of scrap PET e.g. from film- and fibre-forming processes, and of reclaim PET, e.g. from film or fibre, to thick-walled shaped articles of adequate impact strength by melt-shaping processes using conventional thermoplastic shaping equipment.

It further allows the production of thick-walled shaped articles wherein the polymer has a molecular weight hitherto thought unattainable.

According to the present invention, we provide a process for the production of thick-walled shaped articles from PET feedstock by melt-shaping, in which the PET is mixed with a polyfunctional compound (as hereinafter defined) before it is shaped, and the concentration of said polyfunctional compound and the conditions of the melt-shaping process are chosen to give in the shaped article polymer having an intrinsic viscosity of at least 0.7 decilitre gram$^{-1}$ as measured on a solution of the polymer in o-chlorophenol at 25° C.

We also provide as a further embodiment of our invention a thick-walled article shaped from poly(ethylene terephthalate) wherein the polymer in said article has an intrinsic viscosity of at least 0.7 decilitre gram$^{-1}$, measured on a solution thereof in o-chlorophenol at 25° C.

By a polyfunctional compound we mean a compound each molecule of which is capable of reaction by addition or condensation with at least two molecular equivalents of groups selected from —OH and —COOH under the conditions of the shaping process.

The success of our invention is thought to be due to the surprising and unpredictable discovery that at the very high temperatures used in the shaping process, the overall effect of the various competing reactions of thermal degradation of the polymer, reaction of the polymer end groups with the polyfunctional compound and thermal dissociation of the links so formed is such that the melt viscosity of the composition remains sufficiently low for sufficiently long to allow successful shaping on conventional thermoplastic shaping machinery, and yet results ultimately in an overall chain lengthening effect which is at least sufficient to offset the degradation that otherwise would have occurred.

Such a result could not have been predicted since little or nothing is known about the individual competing reactions at these high temperatures in isolation, let alone about their effect upon each other.

The term poly(ethylene terephthalate), or PET, as used throughout this specification also includes copolymers wherein in the polymer chains a minor proportion of the terephthalate residues have been replaced by other dicarboxylic acid residues e.g. isophthalate residues, and/or a minor proportion of the ethylene glycol residues have been replaced by other diol residues, e.g. diethylene glycol residues and/or diamine residues, and/or a minor proportion of the ethylene terephthalate residues have been replaced by residues derived from hydroxy-acids, amino-acids, lactones and/or lactams, so long as said copolymers are capable of crystallising to the extent of at least 15%. The ability of the copolymer to crystallise may be tested by subjecting it to annealing conditions until maximum crystallinity has been achieved and then calculating the extent of the crystallisation from the relationship $$\text{Percent crystallinity} = \frac{\overline{Va} - \overline{Vp}}{\overline{Va} - \overline{Vc}} \times 100$$

where $\overline{V}$ is the specific volume at room temperature, $a$ and $c$ relate to the wholly amorphous and wholly crystalline materials and $p$ relates to the material under investigation.

Preferably, at least 90% and most preferably all of the repeating units in the polymer chains are ethylene terephthalate units. It is also desirable, of course, that as many as possible of the polymer chains of the PET feedstock are terminated by —OH and/or —COOH groups in the melt.

Our invention is especially applicable to the injection-moulding of PET. However, it may also be used for the extrusion thereof, e.g. to rod and thick-walled tube, and to the compression-moulding or transfer-moulding thereof.

The invention is particularly remarkable in that it provides for the first time a method of obtaining shaped articles from PET which have desirable physical properties without the need to provide special processes and apparatus to manufacture new grades, and particularly ultra-high molecular weight grades, of PET. However, much of the advantage of the process may be lost if PET having a molecular weight corresponding to an intrinsic viscosity of less than 0.3–0.5 decilitre gram$^{-1}$ is used.

The polyfunctional compound found in the composition of our invention is characterised by having, or being thermally or otherwise dissociable to, a compound having one or more functional components such that it is capable of reacting with at least two groups each of which is either —OH or —COOH. Examples of such functional components are carboxylic acid groups; carboxylic acid anhydride groups; acid halide, e.g. acid chloride and acid bromide groups; epoxide groups; and isocyanate groups.

Preferred examples of polyfunctional compounds that may be used are poly(carboxylic acid anhydrides), polyepoxides, polyisocyanates and compounds which are thermally or otherwise dissociable under the conditions of the shaping process to polyisocyanates, hereinafter referred to as polyisocyanate generators. By the terms poly(carboxylic acid anhydrides), polyepoxides and polyisocyanates, we mean organic compounds containing two or more carboxylic acid anhydride (—CO.O.OC—), epoxide and isocyanate groups, respectively.

It is preferred to use those polyfunctional compounds which are not highly volatile at the processing temperature and it is particularly preferably to use those that will react with the minimum of by-product formation. Especial examples of the latter group are those compounds with isocyanate, epoxide and/or anhydride groups as functional components, and uretidione dimers and higher molecular weight uretidione oligomers of polyisocyanates.

The use of poly(carboxylic acid anhydrides), e.g. of tetra- or higher-functional carboxylic acids, is noteworthy where it is especially desirable to avoid discolouration in the shaped articles. Examples of the preferred aromatic compounds are pyromellitic acid dianhydrides; naphthalene tetracarboxylic acid dianhydride such as the 1,4,5,8-, 2,3,6,7-, and 1,2,5,6-isomers; mellitic acid trianhydride; perylene-3,4,9,10-tetracarboxylic acid dianhydride; and dianhydrides having the structure:

where Y is a direct link, —O—, —SO$_2$—, —CO—, or divalent hydrocarbon e.g. —CH$_2$— or —C(CH$_3$)$_2$—; for example 3,3',4,4' - biphenyl tetracarboxylic acid dianhydride and its 2,2',3,3'-isomer; bis(3,4 - dicarboxyphenyl) alkane dianhydrides e.g. the dianhydride of 2,2-bis(3,4-dicarboxyphenyl)propane; bis(3,4 - dicarboxyphenyl)sulphone dianhydride; bis(3,4-dicarboxyphenyl)ether dianhydride and benzophenone-3,3',4,4'-tetracarboxylic acid dianhydride. Ethylene tetracarboxylic acid dianhydride may also be mentioned. The much preferred polyanhydride is pyromellitic acid dianhydride.

Figure 1:
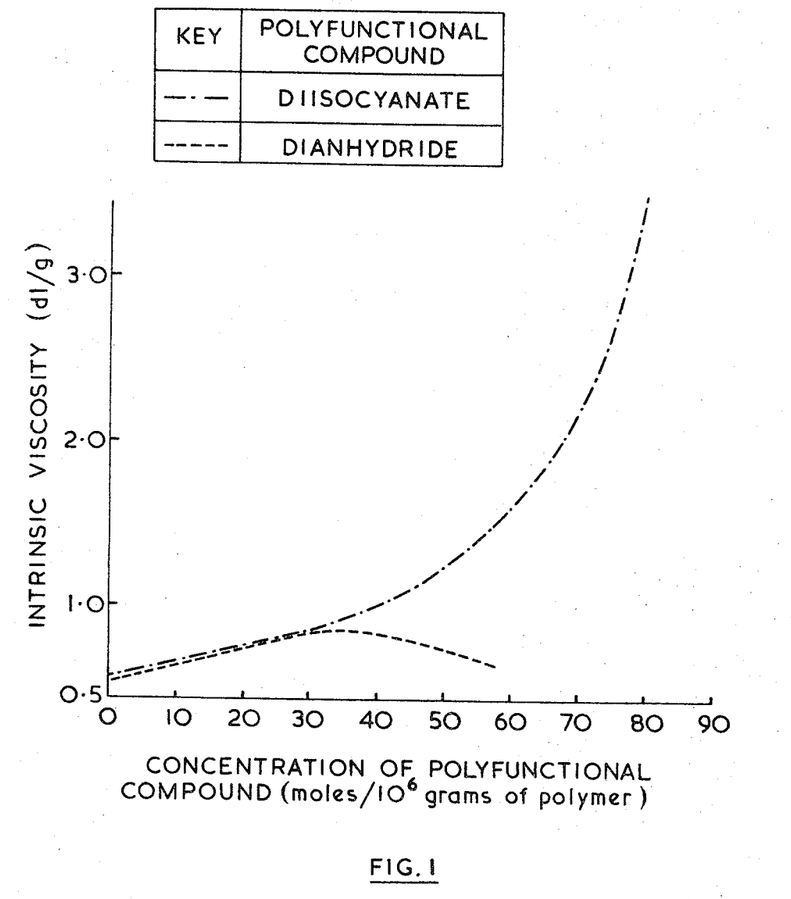

Preferably, the polyfunctional compound contains groups which are capable of reacting with both —OH and —COOH groups. In this class, polyisocyanates and polyisocyanate generators are especially noteworthy since not only do they react (or, on heating, yield compounds which react) with both —OH and —COOH groups to give urethane and amide linkages respectively but they may also react with the linkages so formed, e.g. to form acylurea and allophanate links. Thus, potentially much greater improvements in physical properties may be obtained from the use of these compounds than from the use of the other polyfunctional compounds named above, as is shown in the two graphs of FIG. 1 which represent the intrinsic viscosities obtainable in the shaped articles as a result of using various concentrations of dianhydrides and diisocyanates, respectively, with PET homopolymer in an injection moulding process.

That polyisocyanates and polyisocyanate-generators should be utilisable at all as polyfunctional compounds in our process is particularly surprising in view of their complex and multitudinous reactions with hydroxyl and carboxyl groups and with the amide and urethane links so formed.

Examples of diisocyanates are (a) polymethylene diisocyanates, e.g. those having the structure:

$$OCN(CH_2)_nNCO$$

where $n$ is a positive integer, for example from 4 to 20, examples being tetramethylene diisocyanate, hexamethylene diisocyanate, dodecamethylene diisocyanate and eicosane 1,20-diisocyanate; (b) derivatives of these compounds wherein one or more of the hydrogen atoms of the methylene groups are replaced by monovalent hydrocarbyl groups, e.g. 4-butylhexamethylene diisocyanate or 2,2,4 and 2,4,4-trimethylhexamethylene diisocyanates; (c) derivatives of (a) or (b) wherein one or more of non-adjacent methylene groups are replaced by —O—, —S— or —NR— where R is hydrogen or monovalent hydrocarbon e.g.

$$OCN(CH_2)_2O(CH_2)_2NCO$$

(d) mononuclear and fused polynuclear diisocyanates, e.g. toluene-2,4-diisocyanate, p-phenylene diisocyanate, xylylene diisocyanates, 3-isocyanatomethyl-3,5,5-trimethylcyclhexyl isocyanate and naphthalene diisocyanates; (e) sulphonyl disocyanates; (f) silicon and phosphorus diisocyanates; and, especially, (g) diisocyanates having the structure OCN—Ar—X—Ar—NCO where each Ar is a divalent, preferably mononuclear, aromatic nucleus in which one or more of the hydrogen atoms may, if desired, be replaced by inert monovalent groups, e.g. alkyl, alkoxy or halogen, and X is a direct linkage or a divalent atom or group, —O—, —S—, —SO$_2$—, —SO—, —NR'— (where R' is monovalent hydrocarbon), —CO— and divalent hydrocarbon, e.g. alkylene. Examples of (g) are the 3,3'-, 4,4'- and 3,4'-diisocyanates of diphenylmethane, 2,2-diphenylpropane and diphenyl ether; 3,3'-dimethyl-4,4'-diisocyanatobiphenyl and 3,3'-dimethoxy-4,4'-diisocyanatobiphenyl. 4,4'-diisocyanatodiphenylmethane gives very good results and is readily available.

Where it is desired to use a diisocyanate and the colour of the product is important, it has been found profitable to use compounds which are substantially involatile under the reaction conditions and wherein the isocyanate groups are attached to non-aromatic carbon atoms, e.g. as in 4,4'-diisocyanatodicyclohexylmethane isomers and mixtures thereof, 2,5-dimethyl-p-xylylene diisocyanate, 1,4-di(2-isocyanatoethyl)-2,5-dimethylbenzene and tetramethyl-p-xylylene diisocyanate. In general, however, when these are used, the compositions require somewhat longer dwell times in the melt than is the case with aromatic diisocyanates, unless a catalyst is added.

Examples of diisocyanate generators are the following derivatives of diisocyanates: polymeric urethanes, uretidione dimers and higher oligmers, cyanurate polymers, urethanes and polymeric urethanes of cyanurate polymers, and thermally dissociable Schiff's base adducts. Particularly preferred examples are uretidione dimers and higher oligomers, e.g. the uretidinone dimer and higher oligomers of diisocyanates of type (g) and especially of 4,4'-diisocyanatodiphenyl methane.

We have found that when the PET is shaped in the presence of the polyfunctional compound in accordance with our invention, the graph obtained by plotting the intrinsic viscosity of the polymer in the resultant shaped articles against the residence time for the composition in the shaping apparatus, e.g. injection moulder or extruder, takes the form of a curve which initially approaches a maximum value for intrinsic viscosity and thereafter decays. The time taken to reach the maximum intrinsic viscosity and the value of that maximum depend upon the nature and concentration of the polyfunctional compound used in the composition, the molecular weight of the PET feedstock and the temperature conditions of the shaping process. For any given combination of PET feedstock and polyfunctional compound, however, the concentration of polyfunctional compound and the shaping conditions appropriate for the production of a shaped article wherein the polymer has the desired intrinsic viscosity may be deduced by simple experiment by a polymer chemist of ordinary skill.

The effect of changing each variable is discussed more particularly below.

(1)(a) Each polyfunctional compound has its own rate of reaction. For the less active compounds, e.g. the aliphatic diisocyanates, longer times are generally required in order to attain the peak value of intrinsic viscosity than is the case for the more active compounds, e.g. the aromatic diisocyanates and their uretidione dimers and higher oligomers.

(b) For any given polyfunctional compounds, increasing its concentration in the composition tends to raise the peak value obtainable for intrinsic viscosity in the shaped article but also lengthens the period required to obtain this value. Where the polyfunctional compound is capable of reaction only with free groups present in the PET, and not with reaction products of such reactions, for example as in the case of an anhydride or epoxide, the theoretical maximum increase in intrinsic viscosity is obtained when there is just sufficient of it present to react with all the free reactive groups of the PET. Quantities in excess of this amount lead to no further improvement and may even be detrimental (see FIG. 1 for dianhydride, for example). Other polyfunctional compounds which are capable of reaction not only with the —OH and —COOH groups of the polymer, but also with the linkages produced by such reactions, especially polyisocyanates as such and in the form of their dissociable derivatives, may advantageously be accommodated in greater proportions.

Figure 3:
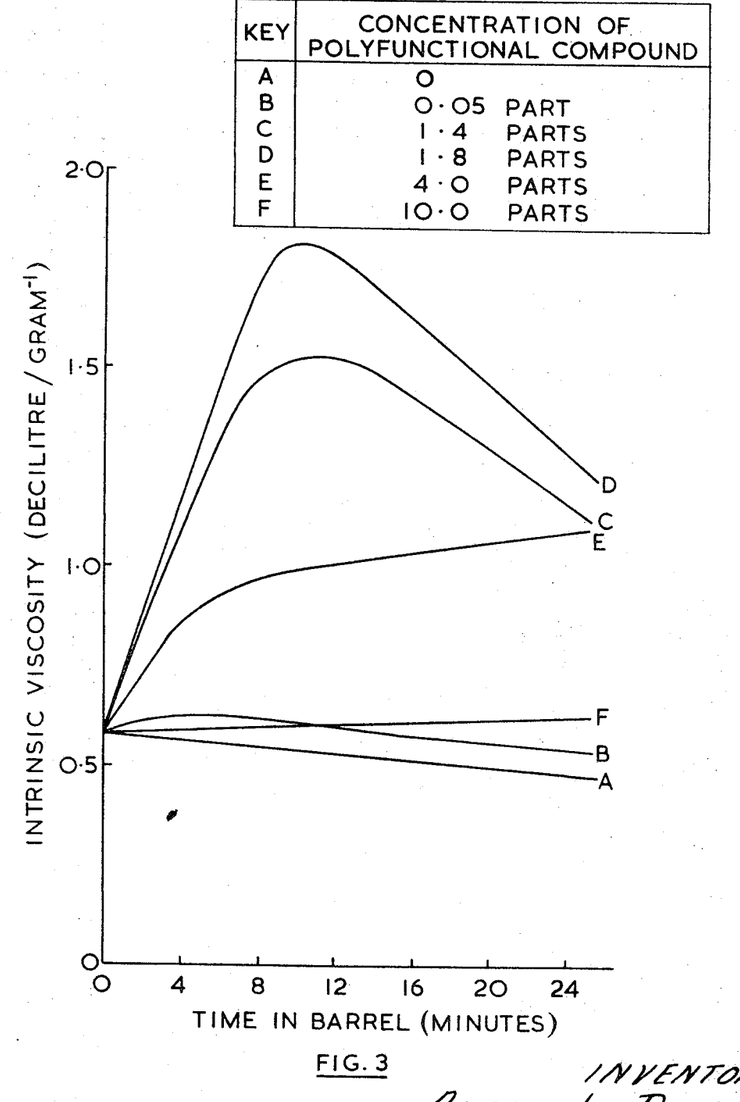

(c) The effect of varying the concentration of the polyfunctional compound is illustrated by the curves of FIG. 3 of the attached drawings. The curves were obtained from compositions comprising 100 parts of PET homopolymer having an intrinsic viscosity of 0.65, 0.5 part of talc, and quantities of 4,4'-diisocyanatodiphenylmethane varying from 0.05 to 10 parts. To form the compositions, the PET was first dried at 140° C. for 3 hours and then blended with the talc while still hot. When it had cooled to about 60° C., the polyfunctional compound was added and the mixture tumbled. The injection moulding was done in a screw-fed machine using a barrel temperature of 255° C., a mould heated to 140° C. and a residence time in the mould of 48 seconds.

(d) The molecular weight and functionality of the polyfunctional compound should also be taken into consideration. Thus, the concentration of polyfunctional compound required to achieve a given rise in intrinsic viscosity will increase with increasing molecular weight and will decrease with increase in functionality. For a polyfunctional compound of molecular weight about 250 and functionality 2, the amount used will generally fall in the range 0.05 to 10% by weight of the polymer, the preferred amount being from 0.5 to 4%. Corresponding concentration ranges may be calculated for polyfunctional compounds of other molecular weights and functionalities. Thus, it may be stated that for a polyfunctional compound of molecular weight M and functionality F (which is the number of —OH and/or —COOH groups with which one molecule of the polyfunctional compound can react, a polyanhydride being taken to have a functionality equal to the number of anhydride groups present) the amount used will generally fall within the range $$\frac{0.4M}{1000F} \text{ to } \frac{80M}{1000F}$$

and preferably $$\frac{4M}{1000F} \text{ to } \frac{32M}{1000F}$$

(expressed as percent by weight of the polymer).

For the purposes of this calculation, the molecular weight and functionality of a uretidione dimer or higher oligomer is taken as that of the monomeric polyisocyanate from which it is formed.

Desirably, the amount of polyfunctional compound is chosen such that with the use of suitable conditions in the shaping process the polymer in the shaped product has a molecular weight corresponding to an intrinsic viscosity of at least 0.9 and preferably from 0.9 to 2.0 decilitre gram$^{-1}$. In order to obtain shaped articles having satisfactory impact strengths from readily available PET which, as stated above, generally has an intrinsic viscosity in the range 0.6 to 0.7 decilitre gram$^{-1}$, and using the most generally desirable shaping conditions, we have found the use of from 0.5 to 3% by weight generally suitable for a polyfunctional compound of molecular weight 250 and functionality 2. Thus, as a general statement for a polyfunctional compound of molecular weight M and functionality F, the suitable concentrations (expressed as percent by weight of the polymer) are from $$\frac{4M}{1000F} \text{ to } \frac{24M}{1000F}$$

(2) The molecular weight of the feedstock PET controls the position of the whole curve on the vertical scale. Thus, for example, with reference to FIG. 3, had the feedstock PET been of lower molecular weight, all the curves would have been displaced downwards, the opposite movement being obtained if higher molecular weight PET had been used.

As a general rule, therefore, the lower the intrinsic viscosity of the starting material, the more polyfunctional compound will be required to achieve a particular increase in intrinsic viscosity. Since, on the whole, the polyfunctional compounds are relatively expensive, it is economically desirable to avoid the use of low molecular weight PET and it is generally desirable for this and other reasons to use PET having an intrinsic viscosity of at least 0.5 decilitre gram$^{-1}$.

Even where it is possible to use in the shaping composition PET whose molecular weight is as high as that required in the shaped article, it is desirable to add polyfunctional compound in accordance with our invention for the purpose of compensating for the loss in molecular weight that would otherwise occur due to degradation of the PET while it is molten.

Figure 4:
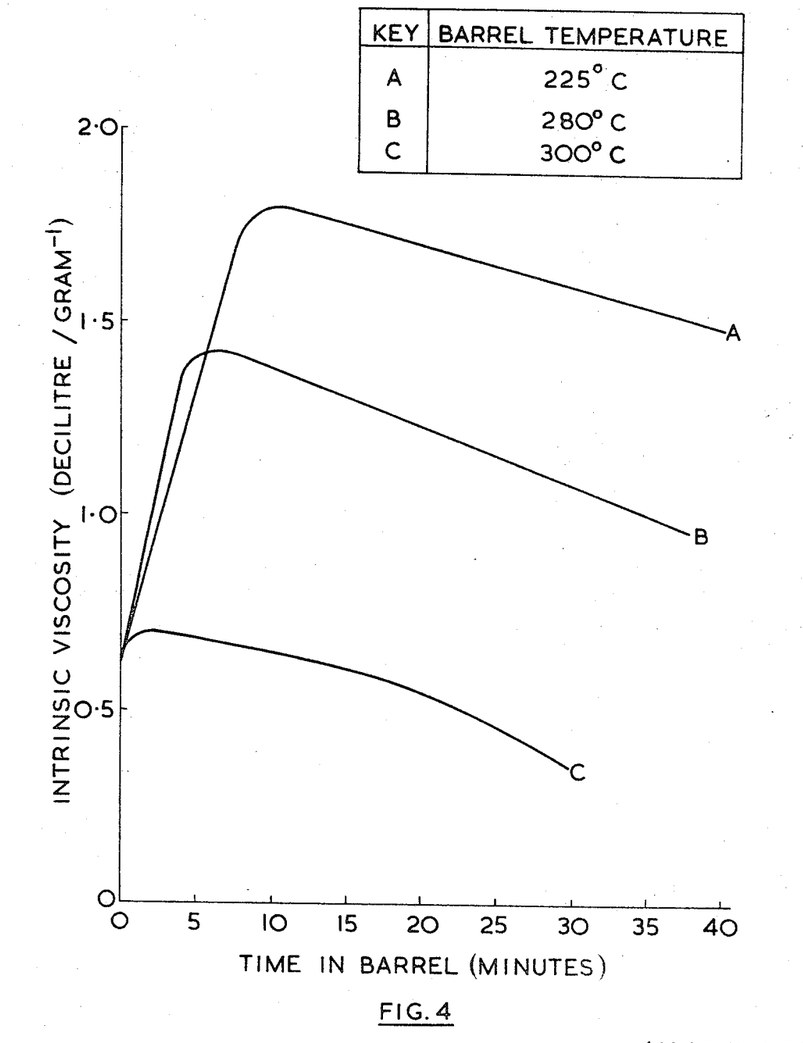

(3) The temperature to which the polymer is subjected while in the apparatus used for shaping, e.g. injection-moulder or extruder, is necessarily above its melting point. The effect of further increasing the temperature is illustrated in FIG. 4 of the attached drawings which show curves for intrinsic viscosity of the polymer in the shaped article against residence time of the composition in the barrel of an injection-moulding machine at various barrel temperatures. The composition used for these examples comprised 100 parts of PET homopolymer having an intrinsic viscosity of 0.65 and prepared using Sb$_2$O$_3$ catalyst, 0.5 part of talc and 1.8 parts of 4,4'-diisocyanatodiphenyl methane. The composition was formed in the same manner as those used in the preparation of FIG. 3. Barrel temperatures of 255, 280 and 300° C. were used with a mould temperature of 140° C. and a residence time in the mould of 48 seconds.

As the temperature is increased, the maximum attainable intrinsic viscosity is reduced in value and is achieved within a shorter time. Therefore, in order to obtain both the maximum advantage from the use of the polyfunctional compound and the maximum freedom of choice of operating conditions in the shaping apparatus, the temperature is preferably chosen to keep the composition to be shaped as little above the melting point as possible. Preferably, temperatures in excess of about 30° C. above the polymer melting point are avoided, temperatures of from 255 to 290° C. being preferred. With the use of such temperatures, dwell times of from ½ to 10 minutes have been found generally satisfactory although longer times may be acceptable or even desirable if polyfunctional compounds of low activity, such as aliphatic diisocyanates, are used.

If desired, the production of thick-walled shaped articles in accordance with our invention may involve more than one process wherein the PET is melt-shaped in the presence of a polyfunctional compound.

Thus, for example, an injection-moulding or extrusion step leading to a finished article may be preceded by a preliminary extrusion step, e.g. for blending purposes. For example, such preliminary extrusion, followed by suitable comminution of the extrudate to chip, granule, powder or other suitable form, has been found to be a particularly suitable method of obtaining a homogeneous mixture of the PET and polyfunctional compound in a form readily usable in the consequent shaping step.

When such a preliminary extrusion step is used, it is preferred that the extrusion conditions are sufficiently mild to avoid unduly restricting the choice of conditions in the subsequent shaping step so as to obtain in the finished article polymer having the desired minimum intrinsic viscosity of 0.7. Extruder barrel temperatures of from 255° C. to 290° C., and dwell times in the extruder of from 30 to 240 seconds are generally preferred. It may also be preferred to cool the extrudate as rapidly as possible.

Some chemical reaction is likely to occur between the PET and the polyfunctional compound during this preliminary extrusion step but this is tolerable so long as the product may still be converted by a further melt-shaping step to a thick-walled shaped article wherein the polymer has an intrinsic viscosity of at least 0.7. Suitable conditions for this extrusion step may readily be determined by simple experiment which is well within the ordinary skill of the polymer technologist.

It will be understood that the product of the preliminary melt-shaping step, e.g. the preliminary extrusion-blending step as herein described, need not be a thick-walled shaped article.

For use in the melt-shaping process or processes, a premixed composition of the polyfunctional compound and the PET may be used if desired. For example, the polymer e.g. in granule, powder or chip form may be dusted with dry polyfunctional compound or coated with melted or liquid polyfunctional compound. One preferred process is to tumble hot PET with liquid or molten polyfunctional compound. Preferably, the PET is at a temperature of from about 50° C. to about 140° C. Conveniently, the mixing may be effected with the hot polymer obtained from the drying process.

Where the composition is to be shaped in accordance with our invention by extrusion in a screw extruder or by moulding wherein the feed mechanism to the mould is a screw, the polyfunctional compound may be added with the PET into the hopper of the extruder or moulding machine or may be mixed with the PET prior to addition to the hopper.

The compound may also be mixed with PET by adding it to a solution of the polymer and then removing the solvent, but problems associated with adequately removing the solvent are then incurred.

Masterbatching techniques may also be used, if desired, for example by blending mixtures of PET and polyfunctional compound which are very rich in polyfunctional compound, or mixtures of the polyfunctional compound with a carrier material, with the composition to be shaped to achieve the desired concentration of polyfunctional compound.

On completion of the shaping process, and to obtain the optimum benefit of the invention, it may sometimes be found advantageous to hold the shaped article at an elevated temperature below the polymer melting point for a time of up to a few minutes before allowing it to cool. The actual temperature and time will depend on the nature of the polyfunctional compound but temperatures of from about 120 to 200° C., and preferably 140 to 180° C. have been found generally suitable. Times of from 20 to about 180 seconds are generally adequate. Alternatively, the shaped article may be cooled and then reheated. In this case similar temperatures may be used but times of up to 30 minutes may be required. By this means, a further increase in intrinsic viscosity may sometimes be obtained in the shaped article. This is particularly desirable where intrinsic viscosities of 1.3 or more are desired. In such cases it is preferred to adjust the conditions in the shaping process so as to avoid exceeding as intrinsic viscosity of more than 1.3 while the PET is in the melt to avoid the difficulties that are produced by the resulting high melt viscosities. The intrinsic viscosity may then be increased to the desired figure by appropriate thermal treatment of the shaped article as described.

By suitable control of the shaping conditions or by suitable treatment of the shaped article, thick-walled shaped articles may be obtained with the polymer in either the amorphous or the crystalline state, as desired. Where high temperature applications are envisaged, e.g. applications where prolonged exposure to temperatures of 70° C. or more are likely, it is desirable that the polymer be in the crystalline state in order to combine adequate form stability with good chemical properties. It is also desirable for the polymer to have an intrinsic viscosity of 0.9 decilitre gram$^{-1}$ or more. However, at very high intrinsic viscosities, both the need to achieve a crystalline state and the ease of so doing tend to be reduced.

Many procedures may be adapted to obtain the articles in the crystalline state but in general they involve maintaining seed nuclei in the polymer when it is in the molten state during the shaping process and/or heat treating the article below the melting point of the polymer to promote crystallisation. This heat treatment may be done in the mould or after the shaped article has been extracted from the mould, for example in parallel with the treatment sometimes found desirable to obtain the optimum benefit from the use of the polyfunctional compound.

For example, during the moulding process it has been found advantageous, when the polymer is in the molten state, to use temperatures as little as possible above its melting point. It has also been found particularly desirable to use a hot mould or to extrude into a hot atmosphere. The temperature of the mould should be at least 105° C., and preferably at least 120° C., in order to induce crystallisation. Preferably, the mould temperature is 140° to 170° C. within which temperature range crystallisation of the polymer occurs at a rapid rate, residence times of 20 to 60 seconds in the mould at these conditions being generally sufficient.

If a heated mould and an adequate residence time in the mould are used, it is not normally necessary to provide an after-shaping heat-treatment. However, where mould temperatures below 105° C. are used and a crystalline article is desired, it has been found profitable, and sometimes even necessary, to subject the formed article to an after-shaping heat treatment to induce the desired crystallinity and textural condition. Temperatures of 110° C. to 200° C., preferably 140 to 170° C., may be used and the time required generally ranges from 5 to 120 minutes.

It has also been found advantageous to include a crystallisation promoter in the polymer composition. This is most conveniently a finely divided solid which is insoluble in PET above the melting point of PET. Suitable concentrations are from 0.01% to 3%, and preferably 0.05% to 0.5%, by weight of the polymer.

Thus, in accordance with another embodiment of our invention, we provide a composition suitable for conversion to shaped articles which comprises (i) poly(ethylene terephthalate), preferably having an intrinsic viscosity of at least 0.3–0.5 decilitre gram$^{-1}$, (ii) a polyfunctional compound (as hereinbefore defined), and (iii) from 0.001% to 3%, and preferably 0.05 to 0.5%, by weight of the PET of a crystallisation promoter.

Examples of solid inert materials suitable for use as crystallisation promoters in finely divided form include calcium carbonate, calcium sulphate, finely divided metals and finely divided metal oxides. Preferred materials, however, are talc and pyrophyllite.

PET-insoluble residues of catalysts used in the reactions to form the PET may also be found to have the desired crystallisation-promoting effect although further crystallisation-promoting material may be added if desired. An example of a catalyst giving such residues is antimony trioxide. Talc and pyrophyllite are especially preferred as added crystallisation promoting materials in conjunction with the residues of this catalyst.

The crystallisation promoter may be incorporated in the composition in any suitable manner. For example, in the case of a finely divided solid it may be added to one or more of the ingredients to be used in the polymerisation reaction to form the PET. Alternatively, it may be added separately to the polymerisation vessel before, during or after the polymerisation. Preferably, however, the crystallisation promoter is added to the already formed PET, most suitably with the polyfunctional compound. This reduces the number of steps required for the production of the composition and, particularly advantageously, avoids interference with the polymerisation process thereby allowing standard film or fibre grade PET to be used in forming the composition.

Where it is desired to obtain a shaped article with the polymer in crystalline form, it has generally been found profitable to choose conditions such that the polymer in the shaped article is at least 15% crystalline and has a crystalline texture such that numerically only a very minor proportion of the crystalline aggregate of the spherulitic type exceed 5 microns in size. There should be no more than 20 such aggregates exceeding 5 microns in size per unit field of vision of $100\mu \times 100\mu$ on microscopical examination of sections of the polymer in the shaped article.

The crystalline polymer is generally more brittle and less resistant to impact than the amorphous polymer and therefore where thick-walled shaped articles of the crystalline material are required it is particularly desirable to achieve a high molecular weight for the polymer in said articles so as to offset as far as possible the loss in impact strength.

We have also found that considerable improvement in physical properties, and especially notched impact strength, may be gained in the shaped article if the composition contains glass fibres. The presence of the glass fibres is particularly desirable if the polymer in the shaped article is in the crystalline form. In general, addition of the glass fibres improves the notched impact strength, initial flexural modulus and breaking stress of the articles obtained from our shaping process. Such improvements are obtainable with the use of as little as 5% of glass (expressed on the basis of the total weight of the composite) and improvements in properties may still be obtained at concentrations as high as 60% or higher. Especially suitable concentrations however are from 10% to 45%, preferably 30 to 45%, since large concentrations of the glass fibres appear to cause some reduction in the intrinsic viscosity of the polymer in the shaped article.

The improvement in notched impact strength gained by the incorporation of glass fibres obviates the necessity for the polymer of the shaped article to have an intrinsic viscosity of 0.7 decilitre gram$^{-1}$ or more although this is still desirable from the point of view of other physical properties.

According to a further embodiment of our invention, therefore, we provide a composition suitable for conversion to thick-walled shaped articles comprising:

(i) poly(ethylene terephthalate), preferably having an intrinsic viscosity of at least 0.3–0.5 decilitre gram$^{-1}$,
(ii) a polyfunctional compound (as hereinbefore defined), preferably but not necessarily in an amount which will yield in an article shaped from the composition a polymer having an intrinsic viscosity of at least 0.7 decilitre gram$^{-1}$,
(iii) glass fibres, preferably in an amount of from 5% to 60% and, optimally 10% to 45% and especially 30 to 45%, by weight of the composition, and optionally
(iv) from 0.001% to 3% by weight of the polymer of a crystallisation promoter, preferably talc or pyrophyllite.

The glass fibres in the composition are preferably 0.2 to 6 mm. in length, and more preferably 0.2 to 1 mm. The length of the fibres in the shaped article, however, will depend to a large extent on the degree of comminution exerted during the mixing and shaping processes and is likely to be very much less than that of the fibres in the composition used in the shaping operation.

Figure 2:
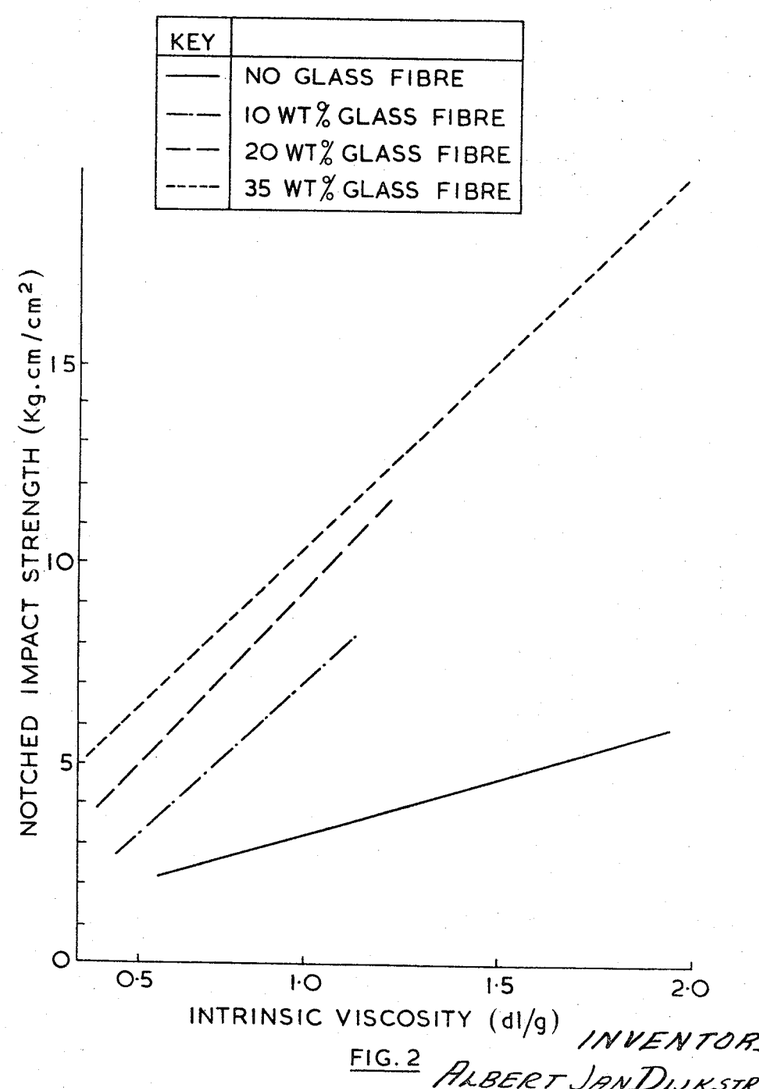

The improvement in notched impact strength gained from the use of the polyfunctional compound and glass fibres in combination is particularly useful. Furthermore, the benefit obtained from incorporating the glass fibres increases with increase in the intrinsic viscosity of the polymer of the shaped article. This is illustrated by the graphs in FIG. 2 in which Hounsfield notched impact strengths of shaped specimens (measured as described in the introduction to the Examples) are plotted against intrinsic viscosities for various concentrations (including zero) of glass fibres.

The glass fibre may be added to the composition in any suitable manner. For example, it may be incorporated with the polyfunctional compound and crystallisation promoter (if any) thereby minimising the number of steps required to form the composition. Greater benefit appears to be obtained, however, if the glass fibres are mixed with the PET before the polyfunctional compound is added. Preferably, the glass fibres are mixed with the molten PET, e.g. in an extruder.

Preferably, the nature and concentration of the polyfunctional compound, and the concentration of glass fibres in the composition to be moulded, are chosen so as to give a shaped article wherein the polymer has an intrinsic viscosity of at least 0.7 decilitre gram$^{-1}$ and in which the notched impact strength, as measuerd as described in the introduction to the Examples is at least 3 kg. cm./cm.$^2$. Most preferably they are chosen to give an intrinsic viscosity of at least 0.9 decilitre gram$^{-1}$ and a notched impact strength of at least 5 to 7 kg. cm./cm.$^2$.

In addition to the crystallisation promoter and/or chopped glass fibre, the composition may also include other additives, e.g. fillers, pigments, dyes, lubricants, heat and light stabilisers, plasticisers, mould release agents, and other polymeric materials, natural or synthetic. One or more of these additives, and particularly the pigment or dye, may itself provide sufficient crystallisation promoting effect, alone or with the insoluble residues of catalyst used in the preparation of the polyethylene terephthalate, to obviate any requirement of added crystallisation promoter.

The composition so obtained may then be shaped as described. As is well-known in the handling of poly(ethylene terephthalate), it is very desirable to keep the composition as moisture-free as possible during the shaping step so as to minimise the danger of hydrolytic degradation. Thus, it is advisable rigorously to dry the PET and all other ingredients of the composition and to handle the composition under dry and moisture-free conditions. Preferably, the moisture-content of the composition should be less than 0.01% by weight.

The use of screw-fed injection moulding apparatus is particularly preferred since the screw action aids intimate mixing of all the ingredients of the composition.

The invention is now illustrated by the following examples in which all parts are expressed as parts by weight except where otherwise indictaed.

In all the following examples except those numbered 23 to 36 the physical properties of the shaped articles were measured as described below.

Notched and unnotched impact strengths were measured on 2 inch x ¼ inch x ⅛ inch bars using a Hounsfield Charpy-type Impact Tester and following the procedure laid down in British Standard Test 2782, the bars being positioned flat (i.e. with the ¼ inch face horizontal) and tested across the direction of polymer flow. For the notched impact strength, the bars had a 40° V-shaped notch cut into the face which is ⅛ inch wide, the notch being 0.110 inch deep and having a 0.010 inch radius tip.

Initial flexural modulus, breaking stress and breaking strain were all measured on specimen bars 2 inches long x ⅜ inch x ⅛ inch using a Hounsfield Type E Tensometer and a strain rate of 0.05 minute$^{-1}$.

Examples 1 to 5 serve to illustrate the effect on the intrinsic viscosity of the polymer in the shaped article of varying the nature and concetration of the polyfunctional compound.

EXAMPLE 1

100 parts of granulated poly(ethylene terephthalate) homopolymer of fibre grade quality, which had been prepared by a polycondensation process involving the use of $Sb_2O_3$ as catalyst and which had been dried in an oven at 130° C. to a moisture content of less than 0.01% by weight and had an intrinsic viscosity of 0.68 decilitre gram$^{-1}$, were dusted under dry essentially moisture free conditions and while still hot with 0.5 part of very finely divided talc (particle size: 100% by weight below 6 microns in size, 58% by weight below 1 micron in size and 16% by weight below 0.25 micron in size) and varying amounts (as indicated in the Table below) of a mixture of uretidione oligomers of 4,4′-diisocyanatodiphenyl methane, which mixture had an average molecular weight of 1,385.

The dusted granules were stored until required in an air-tight container. They were then introduced into the hopper of a Stübbe two-ounce screw-fed injection-moulding machine having a barrel temperature of 270° C. and a mould temperature of 140° C. The moulding cycle included an average residence time in the barrel of six minutes and residence time in the mould of 30 to 40 seconds. The injection pressure was about 2,000 lbs./sq. in. On examination, all the moulded samples were found to comply with the preferences as to crystallinity and textural condition. The intrinsic viscosities of the polymeric materials were measured and recorded in the table below.

| Experiment: | Uretidione oligomers (parts by weight) | Cooling time in the mould (seconds) | Intrinsic viscosity of moulded sample (decilitre gram$^{-1}$) |
|---|---|---|---|
| Blank | 0 | 30 | <0.68 |
| A | 0.5 | 40 | 0.85 |
| B | 0.8 | 30 | 0.96 |
| C | 1.0 | 30 | 1.07 |
| D | 1.1 | 40 | 1.20 |

EXAMPLE 2

In a further series of experiment applying the process of Example 1 but using poly(ethylene terephthalate)homopolymer with an intrinsic viscosity of 0.65 decilitre gram$^{-1}$ the results obtained were as follows:

| Polyfunctional compound | Amount added, weight percent | Intrinsic viscosity of polymer in moulded article (decilitre gram$^{-1}$) |
|---|---|---|
| Experiment: | | |
| A........ Mixture of uretidione oligomers of 4,4'-diisocyanatodiphenyl-methane; the mixture having an average molecular weight of 500–1,000. | 0.5 | 0.70 |
| B............do............................ | 0.8 | 0.85–1.01 |
| C............do............................ | 1.1 | 0.92 |
| D............do............................ | 2.0 | 1.32–2.2 |
| E........ A difunctional liquid isocyanate having an isocyanate number of 144 and sold as Isonate 143L. | 0.55 | 0.76 |
| F............do............................ | 1.1 | 0.97 |
| G............do............................ | 1.65 | 1.60 |
| H............do............................ | 2.2 | 3.4 |
| J........ A mixture of the stereoisomers of 4,4'-diisocyanatodicyclohexyl-methane, hereinafter referred to as PICM. | 1.2 | 0.85 |

The crystallinities of the polymer matrices of the shaped articles obtained from all these samples were found to be in the range 30–40%.

The value for crystallinity was derived from the relationship:

$$\text{Percent crystallinity} = \frac{\overline{V}a - \overline{V}p}{\overline{V}a - \overline{V}c} \times 100$$

where $\overline{V}$ is the specific volume at room temperature and $a$ and $c$ relate to pure amorphous and fully crystalline materials respectively and $p$ relates to the sample under examination.

The notched impact strength of the sample of experiment C was found to be 1.70 ft. lb./inch$^2$ (i.e. 3.6 kg. cm./cm.$^2$).

EXAMPLE 3

100 parts of the dried polymer used in Example 1 were dusted while still hot with 0.5 part of the talc used in Example 1 and 0.8 part of 4,4'-diisocyanatodiphenyl-methane (hereinafter referred to as MDI) and the dusted granules were extruded into ¼ inch diameter rod using 1¼ inch Iddon extruder with a barrel temperature at the feed end of 270° C., at the die of 230° C. and intermediately of 260° C. average and operating at 20 r.p.m. The extruded article had an intrinsic viscosity of 0.88 decilitre gram$^{-1}$.

Repeating the process with 1.5 parts of the diisocyanate yielded a product in which the intrinsic viscosity was found to be greater than 1.1.

EXAMPLE 4

The experiments and conditions of Example 1 were repeated using anhydrides in place of the uretidione oligomers as polyfunctional compounds. The results are tabulated below:

| | Nature and concentration of dianhydride (parts by weight) | Intrinsic viscosity of polymer in moulded sample (decilitre gram$^{-1}$) |
|---|---|---|
| Experiment: | | |
| Blank........................ | | 0.51 |
| A............................ | PMDA*—0.5 | 0.77 |
| B............................ | PMDA*—0.8 | 0.84 |
| C............................ | PMDA*—1.0 | 0.75 |
| D............................ | MTA*—0.5 | 0.90 |

*PMDA is pyromellitic acid dianhydride. MTA is mellitic acid trianhydride.

EXAMPLE 5

An intrinsic viscosity of 0.81 decilitre gram$^{-1}$ was obtained when the dianhydride used in 4C was replaced by the bis-glycidyl ether of 2,2(4,4' - dihydroxydiphenyl) propane.

Examples 6 to 9 illustrate the effect of varying the residence time of the composition in the barrel of the moulding machine and of varying the temperature of the barrel.

EXAMPLE 6

Poly(ethylene terephthalate) homopolymer having an intrinsic viscosity of 0.58 decilitre gram$^{-1}$ and prepared using Sb$_2$O$_3$ catalyst was dried and mixed while still hot with 1.5% of its weight of MDI at a temperature above the melting point of the MDI. The mix was then cooled below the melting point of the MDI while being tumbled.

Samples of the resulting composition were moulded in a 2 ounce Stübbe injection-moulding machine using a barrel temperature of 295° C., an unheated mould, and various residence times. The intrinsic viscosities of the polymer matrices of the final articles were measured and are recorded below:

| | Residence time in barrel (minutes) | Intrinsic viscosity of polymer (decilitre gram$^{-1}$) |
|---|---|---|
| Experiment: | | |
| A............ | 1 | 0.74 |
| B............ | 6 | 1.16 |
| C............ | 50 | 0.43 |

EXAMPLE 7

The process of Example 6 was repeated but using 3% of MDI, based on the weight of poly(ethylene terephthalate). A series of experiments was completed using varying residence times and barrel temperatures and the intrinsic viscosities of the polymer matrices of the moulded articles were measured. The results are recorded below.

| | Residence time in barrel (minutes) | Barrel Temp. (° C.) | Intrinsic viscosity of polymer (decilitre gram$^{-1}$) |
|---|---|---|---|
| Experiment: | | | |
| A............ | 3 | 280 | 0.91 |
| B............ | 6 | 280 | 0.99 |
| C............ | 14 | 280 | 1.52 |
| D............ | 14 | 300 | 1.16 |

EXAMPLE 8

In each of a series of experiments, 100 parts of poly(ethylene terephthalate) homopolymer formed using Sb$_2$O$_3$ as polymerisation catalyst and having an intrinsic viscosity of 0.65 decilitre gram$^{-1}$ were dried in an oven at 130° C. for 3 hours. The polymer was then mixed while still hot with 0.5 part of talc, cooled to a temperature of about 60° C., and then tumble-blended with various amounts of MDI. In each experiment, the mixture was then cooled and samples were injection-moulded in a 2 ounce Stübbe injection-moulding machine using a barrel temperature of 255° C., a mould temperature of 140° C., a residence time in the mould of 48 seconds and varying residence times in the barrel. In each experiment, the intrinsic viscosity of the polymer in the shaped article was measured and the results are tabulated below.

| | Concentration of polyfunctional compound (parts by weight) | | | | | |
|---|---|---|---|---|---|---|
| | 0 | 0.05 | 1.4 | 1.8 | 4.0 | 10.0 |
| Intrinsic viscosity of polymer in shaped article as a result of residence time in barrel of: | | | | | | |
| 5 minutes............ | (¹) | 0.62 | 1.2 | 1.3 | 0.9 | (¹) |
| 6 minutes 40 secs......... | 0.55 | (¹) | (¹) | (¹) | (¹) | (¹) |
| 8 minutes............ | (¹) | (¹) | (¹) | 1.7 | (¹) | (¹) |
| 15 minutes........... | 0.52 | (¹) | 1.45 | 1.66 | (¹) | 0.61 |
| 25 minutes........... | (¹) | 0.54 | 1.16 | 1.25 | 1.1 | 0.63 |

¹ Not measured.

EXAMPLE 9

In a series of experiments, compositions prepared as described in Example 8 above but all having the same constitution of 100 parts polymer, 1.8 parts MDI and 0.5 part talc, were injection moulded in a 2 ounce Stübbe injection-moulding machine using varying residence times and barrel temperatures. In each experiment, the intrinsic viscosity of the polymer in the shaped article was measured and the results are tabulated below.

|  | Residence time in barrel (minutes) | | | | | | | | |
| --- | --- | --- | --- | --- | --- | --- | --- | --- | --- |
|  | 3½ | 5 | 8 | 11½ | 15 | 20 | 30 | 43½ | 50 | 60 |
| Intrinsic viscosity in moulded article: | | | | | | | | | |
| Barrel temp. 255° C | (¹) | (¹) | 1.73 | (¹) | 1.67 | (¹) | (¹) | (¹) | 1.41 | 1.29 |
| Barrel temp. 280° C | 1.30 | (¹) | (¹) | 1.37 | (¹) | 1.1 | (¹) | 0.87 | 0.69 | (¹) |
| Barrel temp. 300° C | (¹) | 0.68 | (¹) | (¹) | 0.61 | (¹) | 0.35 | (¹) | (¹) | (¹) |

¹ Not measured.

EXAMPLE 10

This example demonstrates how the poly(ethylene terephthalate) and the polyfunctional compound may be blended by extrusion and thereafter moulded in accordance with our invention.

100 parts of poly(ethylene terephthalate)homopolymer having an intrinsic viscosity of 0.59±0.01 decilitre gram$^{-1}$ and prepared using $Sb_2O_3$ catalyst were dried for 4 hour at 120° C. under vacuum and stored in a desiccator. The dried polymer was then mixed hot with 3 part of finely divided talc, by tumbling in a sealed con-isocyanatodiphenylmethane used in Example 2A, and 0.5 part of finely divided talc, by tumbling in a scaled container for 30 minutes, and the mixture was returned to the desiccator for storage before the next treatment.

The dry mixture was then fed to a 1¼ inch Iddon extruder fitted with a screw of the type used for polythene. The die temperature was adjusted to 260° C., the head temperature was 265° C. and the temperatures of zones 1 to 4 were all set at 275° C. The extruder was set at 55 r.p.m. giving an average residence time in the machine of about 2½ minutes. The extrudate, in the form of ¼ inch diameter rod was then granulated and dried for at least 2 hours at 120° C. The intrinsic viscosity of the polymer of the extrudate was found to be 0.69 decilitre gram$^{-1}$.

The granulated extrudate was used as the feedstock to a screw-fed 2 ounce Stübbe injection-moulding machine using a barrel temperature of 265° C., a mould temperature of 140° C. and maximum injection and clamping pressures. The injection cycle comprised a 20 second injection time, a dwell time of 3 minutes in the mould and a 10 second interval between cycles. The average dwell time in the barrel of the moulding machine was 10½ minutes.

Crystalline mouldings were obtained having an intrinsic viscosity of 1.00 decilitre gram$^{-1}$, and a notched impact strength of 3.1 kg. cm./cm.$^2$.

If it is desired to use less polyfunctional compound, then shorter overall processing times should be used. For example, if the concentration of uretidione oligomers is reduced to 1 part per 100 parts of polymer, it is preferred that the overall residence time of the composition above the melting point of the polymer (i.e. the total residence time in the extruder and the injection-moulding machine) be reduced to about 4 minutes. Conversely, with higher concentrations of polyfunctional compound, longer overall residence times may be tolerable, if desired. Equally, where it is necessary to use specific processing conditions, the suitable range of concentrations of polyfunctional compound may be established by simple experiment.

When glass fibres are included in the composition, it may be found desirable to use somewhat shorter processing times than would be used for similar compositions without the added glass fibre. This may be avoided at least to some extent, however, if the glass fibre is rigorously dried before being mixed with the other components of the composition.

EXAMPLE 11

This example illustrates the effect on the properties of the product of incorporating glass fibres in the composition to be shaped.

In each of a series of experiments, 100 parts of dry poly(ethylene terephthalate) homopolymer having an intrinsic viscosity of 0.65 decilitre gram$^{-1}$ and prepared using $Sb_2O_3$ as catalyst were extruded with varying amounts of chopped glass fibre ¼ inch long, 13 microns in diameter, and having a vinyl trichlorsilane finish. The extrudate was chopped up and extruded again with 2 parts of MDI and 0.5 part of talc in a 1¼ inch Iddon extruder using a barrel temperature of 265° C. and a residence time of 70 to 90 seconds. The product was chopped up and fed to a 2 ounce Stübbe injection-moulding machine and moulded using a barrel temperature of 265° C., a mould temperature of 140° C., an injection time of 20 seconds, an interval time of 10 seconds between moulding cycles and a moulding time of 48 seconds. The average residence time in the barrel was 3½ minutes.

The notched impact strength, unnotched impact strength, initial flexural modulus, breaking stress, breaking strain and intrinsic viscosity of each moulded article were measured and the results are recorded below.

| Concentration of glass (percent by weight of composition) | Notched impact strength (kg. cm./cm.²) | Unnotched impact strength (kg. cm./cm.²) | Initial flexural modulus (10⁴ kg./cm.²) | Breaking stress (10³ kg./cm.²) | Breaking strain | Intrinsic viscosity (decilitre gram$^{-1}$) |
| --- | --- | --- | --- | --- | --- | --- |
| 0 | 2.25 | 45.0 | 2.49 | 1.29 | ---------- | 0.87 |
| 5 | 2.6 | 19.9 | 2.80 | 1.24 | ---------- | 0.86 |
| 10 | 2.7 | 19.1 | 3.53 | 1.39 | 0.051 | 0.88 |
| 20 | 3.8 | 16.6 | 5.20 | 1.54 | 0.033 | 0.70 |
| 30 | 6.2 | 32.8 | 6.26 | 2.01 | 0.038 | 0.70 |
| 40 | 8.2 | 42.1 | 7.61 | 1.78 | 0.026 | 0.65 |
| 50 | 7.5 | 32.6 | 8.18 | 2.34 | 0.032 | 0.65 |
| 60 | 10.7 | 41.1 | 11.47 | 2.52 | 0.027 | 0.60 |

Examples 12 to 21 serve to illustrate the effect on the properties of the shaped article of varying the concentration of the polyfunctional compound and/or the conditions of the shaping step so as to obtain variations in the intrinsic viscosity of the polymer in the shaped article, while maintaining the concentration of the glass fibres constant in terms of the amount of polymer present.

EXAMPLE 12

In this example, a series of compositions were prepared from 100 parts of poly(ethylene terephthalate) homopolymer having an intrinsic viscosity of 0.65 and formed using $Sb_2O_3$ as polymerisation catalyst, 0.5 part of talc, 3 parts of MDI and 53±4 parts of glass fibre. Each composition was injection moulded in a 2 ounce Stübbe injection-moulding machine using a hot mould (140° C.). The other moulding conditions, particularly barrel temperature and residence time in the barrel, were varied in order to obtain polymers of different intrinsic viscosities in the shaped article. The intrinsic viscosities and the notched impact strengths of the articles so obtained were then measured and the results are tabulated below.

| Intrinsic viscosity (decilitre gram$^{-1}$) | Notched impact strength (kg.cm./cm.$^2$) |
|---|---|
| 0.59 | 6.3 |
| 0.69 | 7.1 |
| 0.74 | 7.8 |
| 0.78 | 7.7 |
| 0.80 | 7.9 |
| 1.00 | 9.9 |

EXAMPLES 13–21

In each of the following examples, 100 parts of dry poly(ethylene terephthalate) homopolymer chip, of intrinsic viscosity 0.58 decilitre gram$^{-1}$ and prepared using $Sb_2O_3$ as polymerisation catalyst, were tumble blended while still hot from the drying process with finely divided talc (0.5% by weight based on the weight of polymer) and the mixture fed through a 1¼ inch diameter screw extruder at a barrel temperature of 260° C. and a screw speed of 60 r.p.m. together with 54 parts of chopped glass fibre having a vinyltrichlorsilane finish. The extrudate was then converted to chip and dried.

Portions of the dried chipped extrudate were tumble blended with varying proportions of a polyfunctional compound. In some experiments, the polyfunctional compound was MDI, in others, a difunctional liquid isocyanate having an isocyanate number of 144 and marketed as "ISONATE" 143L was used. The resultant composition was injection moulded from a 2 oz. Stübbe injection-moulding machine using a barrel temperature of 265 to 280° C. a mould temperature which in some experiments was 140° C. and in others was room temperature, an injection time of 45 secs., and a cooling time of 45 secs., to give 2 inch x ¼ inch x ⅛ inch bars and 2 inch x ⅜ inch x ⅛ inch bars (end-gated).

The samples which had been injection moulded into room temperature moulds were subjected to further heat treatment, at 140° C. for 20 minutes.

The intrinsic viscosities and notched and unnotched impact strengths of the polymer in the injection moulded samples were measured, and the results are shown in the following table:

| Example No.: | Polyfunctional compound | Polyfunctional compound (percent by weight based on weight of polymer) | Injection moulding barrel temperature (° C.) | Injection moulding mould temperature (° C.) | Intrinsic viscosity (dl./g.) | Notched impact strength (kg.cm./cm.$^2$) | Unnotched impact strength (kg.cm./cm.$^2$) | Flexural modulus (l g./cm.$^2$) |
|---|---|---|---|---|---|---|---|---|
| Blank | Nil | 0 | 265 | 140 | 0.40 | 5.2 | 12 | 52,700 |
| 13 | MDI | 1.5 | 265 | 140 | 0.69 | 6.9 | 27 | 50,000 |
| 14 | MDI | 2.0 | 275 | 140 | 0.72 | 7.1 | 33 | 46,900 |
| 15 | MDI | 2.5 | 280 | 140 | 0.77 | 10.7 | 40 | 48,600 |
| 16 | MDI | 3.0 | (¹) | (²) | 0.69 | 8.0 | 25 | (¹) |
| 17 | MDI | 3.5 | (¹) | (²) | 0.99 | 10.3 | 34 | (¹) |
| 18 | Isonate 143L | 1.5 | (¹) | (²) | 0.93 | 11.1 | 39 | (¹) |
| 19 | Isonate 143L | 2.0 | (¹) | (²) | 0.94 | 10.5 | 37 | (¹) |
| 20 | Isonate 143L | 2.5 | (¹) | (²) | 1.53 | 14.1 | 37 | (¹) |
| 21 | Isonate 143L | 3.0 | (¹) | (²) | ~2.1 | ~21.0 | (¹) | (¹) |

¹ Not measured.
² Room temperature.

EXAMPLE 22

The process described for Examples 13 to 21 was repeated in a number of experiments using a variety of polyfunctional compounds and various concentrations of glass fibre having a chrome methacrylate finish. The impact strengths of the products were measured by the method described for Examples 13 to 21 and are tabulated below. The concentrations of polyfunctional compound are recorded as percent by weight of poly(ethylene terephthalate).

| Glass fibre content (percent by wt. of composite) | With no polyfunctional compound, impact strength* | | With 1% of the uretidione oligomer mixture used in Example 2A, impact strength* | | With 1.5% of Isonate 143L, impact strength* | | With 2% of Isonate 143L, impact strength* | |
|---|---|---|---|---|---|---|---|---|
| | Notched | Unnotched | Notched | Unnotched | Notched | Unnotched | Notched | Unnotched |
| 0 | 1.0 | 5.6 | 2.3 | 6.1 | 2.7 | 9.7 | | |
| 10 | 1.8 | 6.7 | 3.3 | 8.0 | 3.3 | 9.8 | 4.9 | 14 |
| 20 | 4.0 | 9.0 | 4.5 | 12 | 7.5 | 20 | 8.8 | 36 |
| 30 | 6.1 | 12 | 5.9 | 16 | 6.9 | 20 | 7.8 | 25 |
| 35 | 6.7 | 19 | 6.8 | 17 | 6.2 | 16 | 8.6 | 26 |

* Recorded as kg. cm./cm.$^2$.

The intrinsic viscosities of the polymers of the moulded articles and the flexural moduli were also recorded and are tabulated below.

| Glass fibre content (percent by wt. of composite) | With no polyfunctional compound | | With 1% of the uretidione oligomer mixture used in Example 2A | | With 1.5% of "Isonate" 143L | | With 2% of "Isonate" 143L | |
|---|---|---|---|---|---|---|---|---|
| | I.V. | Flex. mod. | I.V. | Flex. mod. | I.V. | Flex. mod. | I.V. | Flex. mod. |
| 0 | 0.50 | 28,700 | 0.57 | 24,100 | 0.64 | 28,600 | | |
| 10 | 0.45 | 36,300 | 0.55 | 34,600 | 0.62 | 35,800 | 0.80 | 39,900 |
| 20 | 0.45 | 44,500 | 0.53 | | 0.78 | 56,600 | 0.99 | 48,800 |
| 30 | 0.42 | 60,800 | 9.62 | 65,300 | 0.76 | 63,300 | 0.86 | 44,100 |
| 35 | 0.46 | 66,700 | 0.48 | 73,600 | 0.59 | 70,800 | 0.81 | 69,809 |

NOTE.—Flexural modulus was recorded as kg./cm.$^2$. intrinsic viscosity (I.V.) was recorded as decilitre gram$^{-1}$.

EXAMPLES 23-36

In each of a series of experiments 100 parts of poly(ethylene terephthalate) homopolymer prepared using an Sb$_2$O$_3$ catalyst and having an intrinsic viscosity of 0.65 decilitre gram$^{-1}$ were dried in an air-circulation oven at 120° C. for 16 hours and then while still hot were shaken for 2-3 minutes in a closed container with 0.5 part of finely divided talc, a polyfunctional compound and various concentrations of glass fibres of various kinds. Each mixture so obtained was fed directly to the hopper of a 2 oz. Stübbe injection-moulding machine fitted with a mould designed to give 4½ inch dia. x ⅛ inch thick side-gated discs. The barrel temperature of the machine was at 260-270° C. but the other injection conditions were varied to suit the different compositions. The mould was fitted with a Churchill oil heater adjusted to maintain a mould surface temperature of 140° C. The cooling time in the mould was varied to suit the different compositions.

Test specimens were then obtained from the discs for the purpose of measuring the physical properties of the injection moulded articles and the results (together with the injection conditions used in each experiment) are tabulated below.

Flexural modulus was measured according to ASTM Test D790-63 on 4 inch x ⅛ inch x ½ inch specimens prepared from the discs.

Yield stress was measured on strips 3 inch long x 0.55 inch wide milled from the discs. The cross-sectional area across the centre of each strip was reduced to 0.0625 sq. in. (9 mm.$^2$) by milling two slots having a 1.22 inch radius of curvature opposite each other in the long edges so that the narrowest width of the specimen was ⅛ inch. A tensile stress was then applied to each strip sufficient to elongate it at a rate of ½ inch/minute and the stress at the yield point (or breaking point) was recorded.

Unnotched impact strength was measured on a specimen with a rectangular cross-section ⅜ inch wide x ⅛ inch thick resting horizontally with the ⅛ inch face uppermost against two supports spaced 1½ inches apart. The specimen was struck on the ⅜ inch face by the pendulum of a Charpy-type Hounsfield impact tester.

Notched impact strength was measured as described for unnotched impact strength but using a specimen ¼ inch wide x ⅛ inch thick having a 0.010 inch radius, 40°, 0.110 inch deep notch cut into the face which is ⅛ inch thick. The specimen was struck on the ⅛ inch face by the pendulum.

EXAMPLE 37

Compositions comprising dry poly(ethylene terephthalate) homopolymer of inherent viscosity 0.65 and made using Sb$_2$O$_3$ catalyst and containing either 1.5% by weight of the mixture of uretidione oligomers used in Example 2A or 0.7% by weight of PMDA or 1.5% by weight of PICM were moulded on a 2 oz. Stübbe injection-moulding machine having a barrel temperature set at 265° C., a mould temperature of 140° C. and an average dwell time in the barrel of about 3 minutes. The effect of varying the injection time and cooling time is recorded below.

| Injection time (secs.) | Cooling time (secs.) | Intrinsic viscosity of polymer in article (dl. g.$^{-1}$) | | |
|---|---|---|---|---|
| | | Oligomers | PMDA | PICM |
| 30 | 30 | 0.74 | 0.77 | 0.81 |
| 45 | 45 | 0.90 | -------- | 0.81 |
| 60 | 60 | 0.74 | 0.88 | 0.74 |

EXAMPLE 38

A moulding composition was prepared containing 100 parts of poly(ethylene terephthalate) homopolymer having an intrinsic viscosity of 0.65 and made using Sb$_2$O$_3$ catalyst, 0.5 part of talc, 0.5 part of the mixture of uretidione oligomers used in Example 2A and 25.3 parts of glass fibre. This was moulded in a 2 oz. Stübbe machine as described in Examples 13-21. The polymer in the shaped article so produced was found to have an intrinsic viscosity of 0.41 decilitre gram$^{-1}$, a notched impact strength of 2.7 kg. cm./cm.$^2$ and an unnotched impact strength of 6.3 kg. cm./cm.$^2$.

EXAMPLE 39

Example 38 was repeated with a composition from which the talc was omitted. The polymer of the shaped article had an intrinsic viscosity of 0.46 decilitre gram$^{-1}$ and the notched and unnotched impact strengths were 3.2 and 7.9 kg. cm./cm.$^2$ respectively.

By way of comparison, a further experiment was carried out in which the talc was reintroduced and the polyfunctional compound was omitted. The intrinsic viscosity of the polymer matrix of the shaped article was only 0.36 decilitre gram$^{-1}$ and the notched and unnotched impact strengths were 1.9 and 4.8 kg. cm./cm.$^2$ respectively.

EXAMPLE 40

The article moulded by the process of Example 7A was subjected to a post-shaping heat treatment at 140°

| | Composition | | | | Injection moulding conditions | | | Properties of product | | | | |
|---|---|---|---|---|---|---|---|---|---|---|---|---|
| Example No. | Polyfunctional compound | Polyfunctional compound, percent by weight of polymer | Glass Fibre | Glass fibre, percent by weight of composition | Injection, secs. | Cooling, secs. | Injection pressure, p.s.i. | Intrinsic viscosity, dl./g. | Yield stress, kg./cm.$^2$ | Flexural modulus, 10$^4$ kg./cm.$^2$ | Impact strength (unnotched) kg.cm./cm.$^2$ | Impact strength (0.254 mm. radius notch) kg. cm./cm.$^2$ |
| Blank | -------- | -------- | -------- | -------- | 30 | 20 | 300 | 0.50 | 630 | 3.23 | 9.24 | 2.0 |
| 23 | MDI | 2.5 | Nil | Nil | 15 | 25 | 550 | 0.65 | 619 | 2.99 | 21.05 | 2.5 |
| 24 | PMDA | 1.3 | Nil | Nil | 20 | 40 | 350 | 0.65 | 444 | 3.21 | 15.45 | 2.2 |
| Blank | -------- | -------- | A | 18.8 | 30 | 20 | 300 | -------- | 649 | 3.79 | 6.0 | 2.6 |
| Blank | -------- | -------- | A | 35.9 | 30 | 20 | 300 | -------- | 562 | 10.55 | 4.29 | 3.6 |
| 25 | MDI | 2.5 | A | 17.0 | 15 | 40 | 550-1,000 | 0.89 | 711 | 5.23 | 18.05 | 3.6 |
| 26 | MDI | 2.5 | A | 39.4 | 15 | 40 | 1,000 | -------- | 925 | 9.35 | 12.45 | 4.4 |
| 27 | PMDA | 1.3 | A | 18.7 | 20 | 40 | 350 | -------- | 628 | 5.13 | 8.15 | 3.2 |
| 28 | PMDA | 1.3 | A | 37.3 | 20 | 40 | 350 | -------- | 836 | 9.95 | 5.80 | 4.0 |
| Blank | -------- | -------- | B | 15.2 | 30 | 20 | 300 | -------- | 456 | 4.91 | 8.36 | 2.2 |
| Blank | -------- | -------- | B | 31.6 | 30 | 20 | 300 | 0.52 | 592 | 9.60 | 4.29 | 3.4 |
| 29 | MDI | 2.5 | B | 14.5 | 15 | 40 | 550-1,000 | 0.68 | 658 | 5.04 | 15.65 | 5.8 |
| 30 | MDI | 2.5 | B | 31.3 | 15 | 40 | 550-1,000 | 0.88 | 920 | 8.27 | -------- | -------- |
| 31 | PMDA | 1.3 | B | 16.4 | 20 | 40 | 350 | -------- | 433 | 4.80 | 6.87 | 2.3 |
| 32 | PMDA | 1.3 | B | 31.5 | 20 | 40 | 350 | 0.43 | 648 | 8.61 | 4.29 | 3.7 |
| Blank | -------- | -------- | C | 22.3 | 30 | 20 | 300 | -------- | 605 | 4.91 | 7.30 | 2.1 |
| Blank | -------- | -------- | C | 21.5 | 30 | 20 | 300 | 0.52 | 461 | 5.81 | 5.88 | 3.4 |
| 33 | MDI | 2.0 | C | 13.7 | 75 | 40 | 900 | -------- | 722 | 4.27 | 27.25 | 3.6 |
| 34 | MDI | 2.0 | C | 23.0 | 75 | 40 | 900 | 0.90 | 914 | 5.70 | 21.05 | 4.7 |
| 35 | PMDA | 1.3 | C | 13.2 | 20 | 40 | 350 | -------- | 533 | 4.30 | 8.15 | 2.5 |
| 36 | PMDA | 1.3 | C | 22.9 | 20 | 40 | 350 | -------- | 479 | 4.78 | 5.80 | 3.3 |

A = Glass fibres having a vinyltrichlorsilane finish.
B = Glass fibre having chrome methacrylate finish, and
C = Glass fibre having a finish of NH$_2$(CH$_2$)$_3$Si(OC$_2$H$_5$)$_3$.

EXAMPLE 41

Poly(ethylene terephthalate) homopolymer having an intrinsic viscosity of 0.58 decilitre gram$^{-1}$ and which had been prepared by an Sb$_2$O$_3$-catalysed polymerisation process was dried and tumble-blended with 1.45% of its weight of a mixture of PICM and 0.5% of its weight of finely divided talc. The resultant composition was moulded in a Stübbe 2 oz. injection-moulding machine using a barrel temperature of 265° C. and a residence time in the barrel of 4 minutes, maximum injection and clamping pressures, 48 seconds mould residence time and a mould temperature of 140° C.

The intrinsic viscosity of the polymer of the shaped article derived from this process was measured and found to be 0.77 decilitre gram$^{-1}$.

EXAMPLE 42

The process of Example 41 was repeated in two experiments in which the residence times of the composition in the barrel of the injection-moulding machine were increased to 17 and 37 minutes respectively. The intrinsic viscosities of the polymer matrices of the shaped articles so obtained were found to be 0.80 and 0.82 decilitre gram$^{-1}$.

EXAMPLE 43

The process of Example 41 was repeated in a number of experiments in which the PICM was replaced by (a) 2,5-dimethyl-p-xylylene diisocyanate, (b) 2,3,5,6-tetramethyl-p-xylylene diisocyanate, (c) 1,4-di(2-isocyanatoethyl)-2,5-dimethylbenzene and (d) trans/trans 4,4'-diisocyanatodicyclohexylmethane. The first two gave products of whiter colour than the second two.

EXAMPLE 44

100 parts of the dry polymer used in Example 1 were dusted with 0.5 part of talc and tumbled with 1.28 parts of an 80/20 mixture of toluene-2,4-diisocyanate and toluene-2,6-diisocyanate. A series of samples were moulded from this composition on a 2 ounce Stübbe injection-moulding machine using a barrel temperature of 255° C., a mould temperature of 140° C., a cooling time in the mould of 48 seconds and varying residence times in the barrel of the machine. The intrinsic viscosity of the polymer in each article was measured and the results are reported below.

| Residence time in barrel (minutes): | Intrinsic viscosity (decilitre gram$^{-1}$) |
|---|---|
| 5 | 0.78 |
| 10 | 1.36 |
| 15 | 2.05 |
| 25 | 1.9 |

EXAMPLE 45

Example 44 was repeated but using as the polyfunctional compound 0.64 part of a mixture of polyfunctional isocyanates containing an average of 2.4 isocyanate groups per molecule and having an average molecular weight of 310. The mixture is marketed commercially as "Suprasec DN" by Imperial Chemical Industries Ltd. of Great Britain. The results were as follows:

| Residence time in barrel (minutes): | Intrinsic viscosity (decilitre gram$^{-1}$) |
|---|---|
| 5 | 1.56 |
| 10 | 1.08 |

EXAMPLE 46

Example 44 was repeated but using as the polyfunctional compound 2.72 parts of a polyurethane obtained from the reaction of equimolar proportions of 2,2-bis(4-hydroxyphenyl)propane and 4,4'-diisocyanatodiphenylmethane. The residence time in the barrel of the injection-moulding machine was 5 minutes and intrinsic viscosity of the polymer in the shaped article was 0.72 deciliter gram$^{-1}$

EXAMPLE 47

A series of compositions were made up as described in Example 44 but replacing the talc by other crystallisation promoting materials. The results are tabulated below.

| Crystallisation promoter | Residence time in barrel (minutes) | Intrinsic viscosity (decilitre gram$^{-1}$) |
|---|---|---|
| Finely divided brand of calcium carbonate sold by Imperial Chemical Industries Ltd. of Great Britain as Winnofil. | 5 | 0.96 |
| | 10 | 1.8 |
| | 15 | 1.56 |
| | 25 | 0.64 |
| Finely divided brand of calcium carbonate sold by Imperial Chemical Industries Ltd. of Great Britain as Winnofil S. | 5 | 0.87 |
| | 10 | 2.5 |
| | 15 | 1.9 |
| | 25 | 1.59 |
| Finely divided pyrophyllite | 5 | 0.9 |
| | 10 | 2.0 |
| | 15 | 1.4 |
| | 25 | 1.4 |

EXAMPLE 48

100 parts of poly(ethylene terephthalate) homopolymer having an intrinsic viscosity of 1.1 decilitre gram$^{-1}$ and prepared using amorphous germanium dioxide as catalyst were mixed as described in Example 44 with 1.82 parts of MDI and 0.5 part of talc and the composition was injection moulded on a 2 ounce Stübbe injection-moulding machine using a barrel temperature of 255° C., a residence time in the barrel of 5 minutes, a mould temperature of 140° C. and a cooling time in the mould of 48 seconds.

The polymer in the article so formed was found to be 30-35% crystalline, to have the desired crystalline texture, and to have an intrinsic viscosity of 1.18 decilitre gram$^{-1}$. The notched impact strength of a section of the injection moulded article, was 3.0 kg. cm./cm.$^2$.

EXAMPLE 49

The process of Example 48 was repeated but without the talc. The crystallinity of the polymer in the injection moulded article was somewhat lower at 15-20% crystalline, with the desired crystalline texture, and intrinsic viscosity was very much higher at 1.74 decilitre gram$^{-1}$. The notched impact strength was 6.0 kg. cm./cm.$^2$.

By way of comparison, the process was repeated using a cold mould. The polymer in the injection moulded article was less than 1% crystalline and the article was unsuitable for extended use at temperatures above about 70° C.

EXAMPLE 50

In order to demonstrate the effect of varying the residence time of the composition in the barrel of the machine, a number of compositions were prepared by mixing 100 parts of poly(ethylene terephthalate) having an intrinsic viscosity of 0.85 decilitre gram$^{-1}$, and prepared using amorphous germanium dioxide as catalyst, with 0.5 part of talc and 1.82 parts of MDI, using the process described in Example 44. Articles were then moulded from the composition using the conditions described in Example 44 but with varying residence times in the barrel. The effect on the intrinsic viscosity of the polymer in the shaped article is recorded below.

| Residence time in barrel (minutes) | Intrinsic viscosity (decilitre gram$^{-1}$) |
|---|---|
| 5 | 1.2 |
| 10 | 1.4 |
| 15 | 1.15 |
| 25 | 1.6 |

EXAMPLE 51

Using the process of Example 44, 100 parts of poly(ethylene terephthalate) homopolymer, prepared using Sb$_2$O$_3$ as catalyst and having an intrinsic viscosity of 0.65 decilitre gram⁻¹, were mixed with 1.82 parts of MDI and 0.5 part of talc. The composition was then injection moulded on a 2 ounce Stübbe injection-moulding machine using a barrel temperature of 255° C., a residence time in the barrel of 5 minutes, a mould temperature of 140° C. and a residence time in the mould of 48 seconds.

The polymer of the article so obtained was 40–45% crystalline with the desired crystalline texture and had an intrinsic viscosity of 1.44 decilitre gram⁻¹. The notched impact strength of a section of the article was 4.5 kg. cm./cm.²

EXAMPLE 52

The process of Example 51 was repeated but omitting the talc. The polymer in the shaped article was 30% crystalline with the desired crystalline texture and had an intrinsic viscosity of 1.35 decilitre gram⁻¹. The notched impact strength of a section of the article was 4.1 kg. cm./cm.²

EXAMPLE 53

The process of Example 51 was repeated but using a residence in the barrel of 35 minutes. The polymer in the shaped article was 30–35% crystalline with the desired crystalline texture, and had an intrinsic viscosity of 0.85 decilitre gram⁻¹. The notched impact strength was 3.1 kg. cm./cm.²

EXAMPLE 54

100 parts of the poly(ethylene terephthalate) of Example 48 were extruded with 54 parts of ¼ inch long by 13 micron diameter glass fibres and the extrudate (in which the intrinsic viscosity of the polymer was 0.52 decilitre gram⁻¹) was then dried. One half of the extrudate was then tumbled with 1.5 parts of MDI and 0.25 part of the talc and the composition was extruded in a 1¼ inch Iddon extruder using a barrel temperature of 265° C. and residence time of 80±10 seconds. The extrudate was injection moulded in a 2 ounce Stübbe injection-moulding machine using a barrel temperature of 265° C., a mould temperature of 140° C., an injection time of 20 seconds, an interval of 10 seconds between moulding cycles and a residence time in the mould of 48 seconds. The polymer in the shaped article was found to have an intrinsic viscosity of 0.79 decilitre gram⁻¹ and the notched and unnotched impact strengths of the article were found to be 8.4 and 39.4 kg. cm./cm.² respectively.

In a further experiment, the second half of the extruded polymer/glass fibre composite was treated as above but omitting the talc. The polymer in the shaped article had an intrinsic viscosity of 0.73, and the notched and unnotched impact strengths were found to be 7.7 and 35.6 kg. cm./cm.²

What we claim is:

1. A process for the production of thick-walled shaped articles from poly(ethylene terephthalate) feedstock by melt-shaping in which before it is shaped the poly(ethylene terephthalate) is mixed with from $$\frac{0.4M}{1000F} \text{ to } \frac{80M}{1000F}$$

parts by weight of poly(ethylene terephthalate) of a polyfunctional compound, each molecule of which is capable of reaction by addition or condensation with at least two molecular equivalents of groups selected from —OH and —COOH under the conditions of the shaping process, where M is the molecular weight and F is the functionality of the polyfunctional compound and the concentration of said polyfunctional compound and the conditions of the melt-shaping process are chosen to give in the shaped article polymer having an intrinsic viscosity of at least 0.7 deciliter gram⁻¹, as measured on a solution of the polymer in o-chlorophenol at 25° C.

2. A process as claimed in claim 1 in which the composition to be shaped also contains a crystallisation promoter for the poly(ethylene terephthalate).

3. A process as claimed in claim 2 in which the crystallisation promoter is a finely divided solid which is insoluble in molten poly(ethylene terephthalate).

4. A process as claimed in claim 3 in which the finely divided solid is present in an amount of from 0.001% to 3% by weight of the poly(ethylene terephthalate).

5. A process as claimed in claim 4 in which the finely divided solid is present in an amount of from 0.05 to 0.5% by weight of the poly(ethylene terephthalate).

6. A process as claimed in claim 3 in which the crystallisation promoter is selected from talc, pyrophyllite, calcium carbonate, calcium sulphate, metals, metal oxides and polymer-insoluble residues of catalysts used in the reaction to form the poly(ethylene terephthalate).

7. A process as claimed in claim 1 in which the shaping conditions are chosen and/or the shaped article is treated so as to obtain in said shaped article polymer which is at least 15% crystalline and has a crystalline texture wherein numerically only a very minor proportion of the crystalline aggregates of the spherulitic type exceed 5 microns in size.

8. A process as claimed in claim 1 in which the melt-shaping process involves subjecting the poly(ethylene terephthalate) to a temperature of from 255 to 290° C. for a period of from ½ minute to 10 minutes.

9. A process as claimed in claim 1 in which the poly(ethylene terephthalate) is injection moulded.

10. A process as claimed in claim 9 in which the mould is at a temperature of from 105 to 200° C.

11. A process as claimed in claim 10 in which the mould is at a temperature of from 140 to 170° C.

12. A process as claimed in claim 10 in which a residence time in the mould of from 20 to 180 seconds is used.

13. A process as claimed in claim 12 in which a residence time in the mould of from 20 to 60 seconds is used.

14. A process as claimed in claim 1 in which the shaped article, after cooling, is reheated to a temperature of from 110 to 200° C. for a period of from 5 to 120 minutes.

15. A process as claimed in claim 1 in which the polyfunctional compound is one in which the functional components are selected from the group consisting of isocyanate, epoxide and anhydride groups.

16. A process as claimed in claim 15 in which the polyfunctional compound is selected from the group consisting of poly(carboxylic acid anhydrides), polyepoxides, polyisocyanates, and uretidione dimers and higher molecular weight uretidione oligomers of polyisocyanates.

17. A process as claimed in claim 1 in which the polyfunctional compound is selected from the group consisting of pyromellitic acid dianhydride, perylene-3,4,9,10-tetracarboxylic acid dianhydride, mellitic acid trianhydride, dianhydrides of naphthalene tetracarboxylic acids, and compounds having the structure:

where Y is selected from the group consisting of a direct link, —O—, —CO—, —SO₂— and divalent hydrocarbon.

18. A process as claimed in claim 1 in which the polyfunctional compound is the bis-glycidyl ether of 2,2(4,4'-dihydroxydiphenyl)propane.

19. A process as claimed in claim 1 in which the polyfunctional compound is a diisocyanate having the structure: OCN—Ar—X—Ar—NCO in which each Ar is a benzene ring and X is selected from the group consisting of a divalent link, —O—, —S—, —SO₂—, —SO—, —CO—, —NR'— where R' is monovalent hydrocarbon, and divalent hydrocarbon.

20. A process as claimed in claim 19 in which the polyfunctional compound is 4,4′-diisocyanatodiphenylmethane.

21. A process as claimed in claim 1 in which the polyfunctional compound is selected from the group consisting of uretidione dimers and higher molecular weight uretidione oligomers of diisocyanates having the structure: OCN—Ar—X—Ar—NCO in which each Ar is a benzene ring and X is selected from the group consisting of a divalent link, —O—, —S—, —SO$_2$—, —SO—, —CO, —NR′— where R′ is monovalent hydrocarbon, and divalent hydrocarbon.

22. A process as claimed in claim 1 in which the polyfunctional compound is selected from the group consisting of isomers of 4,4′-diisocyanatodicyclohexylmethane, 2,5-dimethyl-p-xylylene diisocyanate, tetramethyl-p-xylylene diisocyanate, and 1,4 - di-(2-isocyanatoethyl)-2,5-dimethylbenzene.

23. A process as claimed in claim 1 in which the polyfunctional compound is used in an amount of from $$\frac{0.4M}{1000F} \text{ to } \frac{80M}{1000F}$$

parts per 100 parts by weight of poly(ethylene terephthalate), where M is the molecular weight of the polyfunctional compound and F is the functionality of the polyfunctional compound.

24. A process as claimed in claim 1 in which the polyfunctional compound is used in an amount of from $$\frac{4M}{1000F} \text{ to } \frac{32M}{1000F}$$

parts per 100 parts by weight of poly(ethylene terephthalate).

25. A process as claimed in claim 1 in which the poly(ethylene terephthalate) feedstock has an intrinsic viscosity of at least 0.5 decilitre gram$^{-1}$, as measured on a solution of the polymer in o-chlorophenol at 25° C.

26. A process as claimed in claim 1 in which the concentration of the polyfunctional compound and the conditions of the shaping process as chosen to give in the shaped article polymer having an intrinsic viscosity of at least 0.9 decilitre gram$^{-1}$, measured on a solution of the polymer in o-chlorophenol at 25° C.

27. A process as claimed in claim 1 in which the composition to be shaped also contains glass fibres in an amount of from 5 to 60% by weight.

28. A process as claimed in claim 27 in which the glass fibres are present in an amount of from 10 to 45% by weight of the composition.

29. A process as claimed in claim 27 in which the glass fibres are 0.2 to 6 mm. in length.

30. A process as claimed in claim 29 in which the glass fibres are 0.2 to 1 mm. in length.

31. A process as claimed in claim 1 in which more than one melt-shaping with at least two molecular equivalents step is involved in the production of the thick-walled shaped article.

32. A process as claimed in claim 31 in which the poly(ethylene terephthalate) and polyfunctional compound are extruded together at a temperature above the melting point of the polymer and the extrudate so obtained is then comminuted and used in a further melt-shaping process to produce the thick-walled shaped article.

33. A process as claimed in claim 32 in which the extrusion is effected using extruder barrel temperatures in the range of 255 to 290° C. and dwell times in the barrel of from 30 to 240 seconds.

34. A shaped article obtained by the process of claim 1.

35. The extrudate formed as an intermediate in the process of claim 32.

36. A composition suitable for use in the process claimed in claim 1 comprising (i) poly(ethylene terephthalate), (ii) from $$\frac{0.4M}{1000F} \text{ to } \frac{80M}{1000F}$$

parts by weight of poly(ethylene terephthalate) of a polyfunctional compound each molecule of which is capable of reaction by addition or condensation with at least two molecular equivalents of groups selected from —OH and —COOH under the conditions of shaping process, where M is the molecular weight and F is the functionality of the polyfunctional compound and the concentration of said polyfunctional compound, and at least one of (iii) a crystallization promoter for the poly(ethylene terephthalate) in an amount of from 0.001 to 3% by weight of the poly(ethylene terephthalate), and (iv) glass fibers in an amount of from 5% to 60% by weight of the composition.

37. A composition as claimed in claim 36 in which the poly(ethylene terephthalate) has an intrinsic viscosity of at least 0.5 decilitre gram$^{-1}$, measured on a solution in o-chlorophenol at 25° C.

38. A composition as claimed in claim 36 in which the polyfunctional compound is one in which the functional components are selected from the group consisting of isocyanate, epoxide and anhydride groups.

39. A composition as claimed in claim 36 in which the polyfunctional compound is selected from the group consisting of poly(carboxylic acid anhydrides), polyepoxides, polyisocyanates, and uretidione dimers and higher molecular weight uretidione oligomers of polyisocyanates.

40. A composition as claimed in claim 36 in which the polyfunctional compound is selected from the group consisting of pyromellitic acid dianhydride, perylene-3,4,9,10-tetracarboxylic acid dianhydride, mellitic acid trianhydride, dianhydrides of naphthalene tetracarboxylic acids, and compounds having the structure:

where Y is selected from the group consisting of a direct link, —O—, —CO—, —SO$_2$— and divalent hydrocarbon.

41. A composition as claimed in claim 36 in which the polyfunctional compound is the bis-glycidyl ether of 2,2(4,4′-dihydroxydiphenyl)propane.

42. A composition as claimed in claim 36 in which the polyfunctional compound is a diisocyanate having the structure: OCN—Ar—X—Ar—NCO in which each Ar is a benzene ring and X is selected from the group consisting of a divalent link, —O—, —S—, —SO$_2$—, —SO—, —CO—, —NR′— where R′ is monovalent hydrocarbon, and divalent hydrocarbon.

43. A composition as claimed in claim 36 in which the polyfunctional compound is 4,4′-diisocyanatodiphenyl methane.

44. A composition as claimed in claim 36 in which the polyfunctional compound is selected from the group consisting of uretidione dimers and higher molecular weight oligomers of diisocyanates having the structure:

OCN—Ar—X—Ar—NCO in which each Ar is a benzene ring and X is selected from the group consisting of a divalent link, —O—, —S—, —SO$_2$—, —SO—, —CO—, —NR′— where R′ is monovalent hydrocarbon, and divalent hydrocarbon.

45. A composition as claimed in claim 36 in which the polyfunctional compound is selected from the group consisting of isomers of 4,4′-diisocyanatodicyclohexylmethane, 2,5-dimethyl-p-xylylene diisocyanate, tetramethyl-p-xylylene diisocyanate and 1,4-di-(2-isocyanatoethyl)-2,5-dimethylbenzene.

46. A composition as claimed in claim 36 in which the polyfunctional compound is used in an amount of from $$\frac{0.4M}{1000F} \text{ to } \frac{32M}{1000F}$$

parts per 100 parts by weight of poly(ethylene terephthalate).

47. A composition as claimed in claim 39 in which the glass fibres are from 0.2 to 6 mm. in length.

48. A thick-walled article shaped from poly(ethylene terephthalate), wherein the polymer in said article has an intrinsic viscosity of at least 0.7 decilitre gram$^{-1}$, as measured on a solution of the polymer in o-chlorophenol at 25° C.

49. A thick-walled article as claimed in claim 48 wherein the polymer in said article has an intrinsic viscosity of at least 0.9 decilitre gram$^{-1}$.

50. A thick-walled shaped article as claimed in claim 48 which contains from 5 to 60% by weight of glass fibres.

51. A thick-walled shaped article as claimed in claim 50, having a notched impact strength of at least 5 kg. cm./cm.$^2$ 52. A thick-walled shaped article as claimed in claim 51, having a notched impact strength of at least 7 kg. cm./cm.$^2$ 53. A process for the production of thick-walled shaped articles from poly(ethylene terephthalate) feedstock by melt-shaping in which before it is shaped the poly(ethylene terephthalate) is mixed with from 5 to 60% by weight of the poly(ethylene terephthalate) of glass fibers and from $$\frac{0.4M}{1000F} \text{ to } \frac{80M}{1000F}$$

parts by weight per 100 parts by weight of poly(ethylene terephthalate) of a polyfunctional compound, each molecule of which is capable of reaction by addition or condensation with at least two molecular equivalents of groups selected from —OH and —COOH under the conditions of the shaping process, where M is the molecular weight and F is the functionality of the polyfunctional compound (and a shaped article having a notched impact strength of at least 2.5 kg. cm./cm.$^2$ is obtained).

References Cited

UNITED STATES PATENTS

| | | | |
|---|---|---|---|
| 3,368,995 | 2/1968 | Furukawa et al. | 260—40 |
| 3,435,093 | 3/1969 | Cope | 260—40X |

MORRIS LIEBMAN, Primary Examiner

L. T. JACOBS, Assistant Examiner

U.S. Cl. X.R.

260—75